(12) United States Patent
Flickinger (10) Patent No.: US 10,478,993 B2
(45) Date of Patent: Nov. 19, 2019

(54) SUPPORT BLOCK FOR BOARD CUTTING

(71) Applicant: JCK Tools, LLC, Earlham, IA (US)

(72) Inventor: Shannon Flickinger, Earlham, IA (US)

(73) Assignee: JCK Tools, LLC, Earlham, IA (US)

( * ) Notice: Subject to any disclaimer, the term of this patent is extended or adjusted under 35 U.S.C. 154(b) by 75 days.

(21) Appl. No.: 15/865,559

(22) Filed: Jan. 9, 2018

(65) Prior Publication Data
US 2018/0194033 A1 Jul. 12, 2018

Related U.S. Application Data

(60) Provisional application No. 62/443,860, filed on Jan. 9, 2017.

(51) Int. Cl.
| | |
|---|---|
| *B23Q 3/04* | (2006.01) |
| *B27B 29/02* | (2006.01) |
| *B23Q 3/06* | (2006.01) |
| *B23Q 3/10* | (2006.01) |

(52) U.S. Cl.
CPC .............. *B27B 29/02* (2013.01); *B23Q 3/04* (2013.01); *B23Q 3/062* (2013.01); *B23Q 3/106* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,907,068 A | * | 9/1975 | Ulerich | E06C 1/005 182/117 |
| 4,537,282 A | * | 8/1985 | Lobdell | E04G 5/00 182/117 |
| 4,836,333 A | * | 6/1989 | Twigger | B25H 1/06 182/181.1 |
| 4,899,963 A | * | 2/1990 | Murphy | F16L 3/137 24/16 R |
| 5,072,901 A | * | 12/1991 | Scott | F16L 1/06 248/49 |
| 5,085,397 A | * | 2/1992 | Henkel | F16M 11/10 182/178.1 |
| 5,320,150 A | * | 6/1994 | Everts | B23D 47/025 108/179 |
| 5,335,753 A | * | 8/1994 | Campbell | B25H 1/06 182/151 |
| D367,329 S | * | 2/1996 | Nelson | D25/118 |
| 6,123,173 A | * | 9/2000 | Patros | B25H 1/08 182/129 |

(Continued)

OTHER PUBLICATIONS

RS 500 Portable Roller Stand is made in the USA and For All Types of Saws, sawblade.com, 1 page. Mar. 19, 2018.

*Primary Examiner* — Monica E Millner (74) *Attorney, Agent, or Firm* — McKee, Voorhees & Sease, PLC (57) ABSTRACT

A carpentry block is provided to support a remote end of a board or work piece to be cut with a table saw or chop saw. The block has a triangular body which can be positioned on any base to define three different heights to support the remote work piece end. The block can also be positioned on the one end to define a fourth height for work piece support. An extension member can be added to the block to provide additional heights with the block, the outer end of the work piece is level with the saw table, thereby assuring an accurate cut of the work piece by the saw blade.

20 Claims, 7 Drawing Sheets

(56) References Cited

U.S. PATENT DOCUMENTS

| | | | | |
|---|---|---|---|---|
| 6,688,050 B2 * | 2/2004 | Sagiao | ............... | E04D 13/12 |
| | | | | 108/64 |
| 7,168,210 B2 * | 1/2007 | Krovats | ............... | E04D 13/12 |
| | | | | 52/167.1 |
| 7,270,216 B2 * | 9/2007 | Elliott | ............... | E06C 1/39 |
| | | | | 182/222 |
| 7,441,731 B2 * | 10/2008 | Smart | ............... | F16L 3/02 |
| | | | | 248/68.1 |
| 7,533,618 B2 * | 5/2009 | Thomason | ............... | A47B 7/00 |
| | | | | 108/42 |
| 7,731,131 B2 * | 6/2010 | Trueb | ............... | E04D 13/00 |
| | | | | 248/49 |
| D627,212 S * | 11/2010 | Hikoyama | ............... | D8/380 |
| 7,866,093 B2 * | 1/2011 | Krovats | ............... | E04D 13/12 |
| | | | | 52/41 |
| D692,393 S * | 10/2013 | Hillman | ............... | D13/102 |
| 8,757,323 B2 * | 6/2014 | Sutton | ............... | B25H 1/04 |
| | | | | 182/181.1 |
| 8,939,415 B2 * | 1/2015 | Dillinger | ............... | E04G 3/265 |
| | | | | 248/148 |
| D738,711 S * | 9/2015 | Tally | ............... | D8/380 |
| 9,528,271 B2 * | 12/2016 | Rook | ............... | E04H 12/12 |
| D810,010 S * | 2/2018 | Rook | ............... | D13/102 |
| 9,930,960 B2 * | 4/2018 | Valliere | ............... | A47B 47/04 |
| 10,202,241 B2 * | 2/2019 | Valliere | ............... | B65G 1/14 |
| 2007/0120036 A1 * | 5/2007 | Olle | ............... | F16L 3/24 |
| | | | | 248/615 |
| 2014/0097190 A1 * | 4/2014 | Kells | ............... | B44D 3/125 |
| | | | | 220/570 |

\* cited by examiner

SUPPORT BLOCK FOR BOARD CUTTING

CROSS-REFERENCE TO RELATED APPLICATIONS

This application claims priority to Provisional U.S. Application Ser. No. 62/443,860 filed on Jan. 9, 2017, which is herein incorporated by reference in its entirety.

BACKGROUND OF THE INVENTION

Construction, carpentry, and other types of woodworking often require wooden boards, metal pieces, or other materials to be cut to a desired length. Various types of saws can be used for the cutting operation, including a chop saw, a table saw, a circular saw, or a hand saw of various types. During the cutting process, a person normally holds the work piece at a location adjacent the saw blade to stabilize the work piece. Maintaining the board or work piece in the proper position during cutting can be difficult, and dangerous, particularly for long pieces which extend beyond the saw table or deck. Furthermore, longer work pieces tend to bow or flex, particularly if the remote end spaced from the saw blade is not supported at the same elevation or level as the cutting end on the table or deck. Such bowing or flexing can lead to inaccurate cuts, such as non-square cuts, which can lead to complications in some applications, such as with finish carpentry work wherein square ends on the board or work piece is critical.

Therefore, there is a need for a device or product which prevents or overcomes the problems of the prior art.

Accordingly, a primary objective of the present invention is the provision of a block for supporting the outer end of a board or work piece during a saw cutting operation.

Another objective of the present invention is the provision of a support block for board cutting which can be moved to various positions to correspond with the height of the saw deck or table.

A further objective of the present invention is the provision of a support block for the outer free end of a board or work piece being cut, such as by a chop saw or table saw, to support the board or work piece outer end at an elevation level with the saw deck or table.

Still another objective of the present invention is a provision of a carpentry block for use with cutting a workpiece, which is economical to manufacture, and safe and simple to use.

A further objective of the present invention is a provision of a block which can be set on different edges to create different heights of the block for use in supporting a work piece at the selected height.

Yet another objective of the present invention is the provision of support block for wood working which has an add-on member to change the dimensions of the block.

Still another objective of the present invention is a provision of a triangular block having four different heights, depending upon its orientation, to support an end of a work piece remote from a saw table or deck.

A further objective of the present invention is the provision of a block that provides support for a work piece during cutting, and having notches to receive an extension to increase the support height of the block.

These and other objectives will become apparent from the following description of the invention.

SUMMARY OF THE INVENTION

A block is provided for supporting the outer end of a board or work piece at a distance spaced from the saw table or deck so as to provide accurate cutting of the board by the saw blade. The block has a triangular shape to allow positioning of the block on any of three sides, or on one end of the block. Each side of the block and the end of the block define a different support height for the work piece, depending upon which side or end of the block is set upon the floor or ground.

In one embodiment, the block has a one-piece construction, with no moving parts. In an alternative embodiment, the block includes a notch on each edge adapted to receive an extension or add-on member to further increase the height of the block, as needed. The extension and block have a tongue and groove, sliding connection.

The block can be positioned to assure that the remote end of the work piece is at the same height as the saw table bed or deck, thereby assuring an accurate cut of the work piece.

DETAILED DESCRIPTION OF THE PREFERRED EMBODIMENTS

The carpentry block of the present invention is designated in the drawings by the reference numeral 10. In one embodiment, the block 10 is formed from molded plastic or composite material, has a unitary construction, has no moving parts, and with no assembly required.

Figure 3:
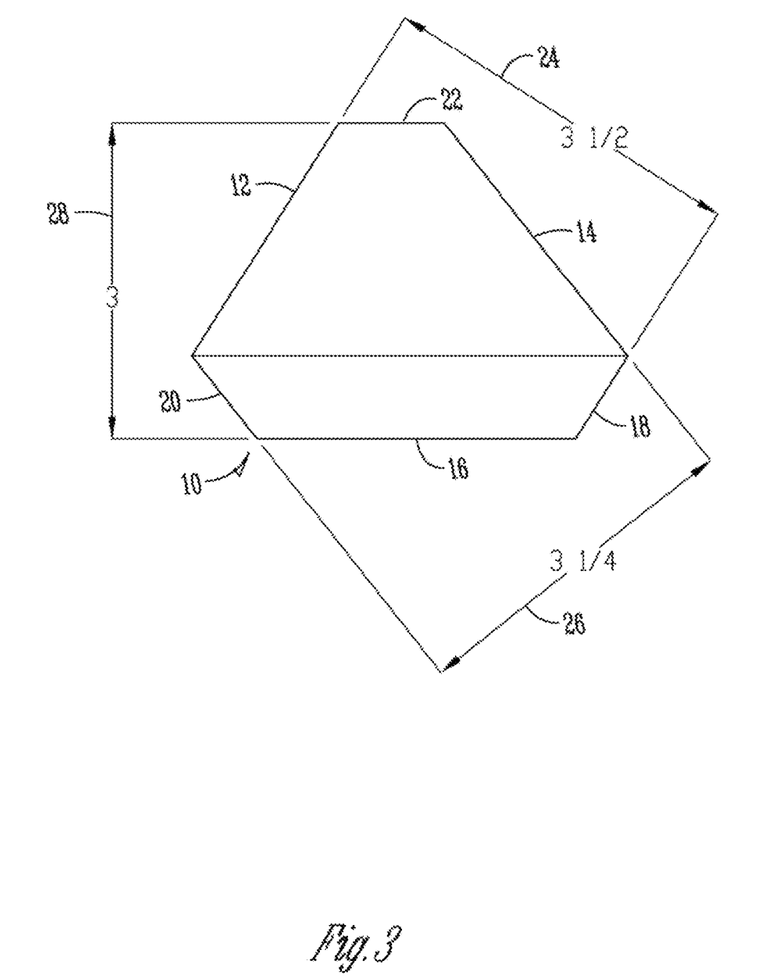
FIG. 3 is an end view of the block showing the different heights to which the block can be rotated.
Figure 4:
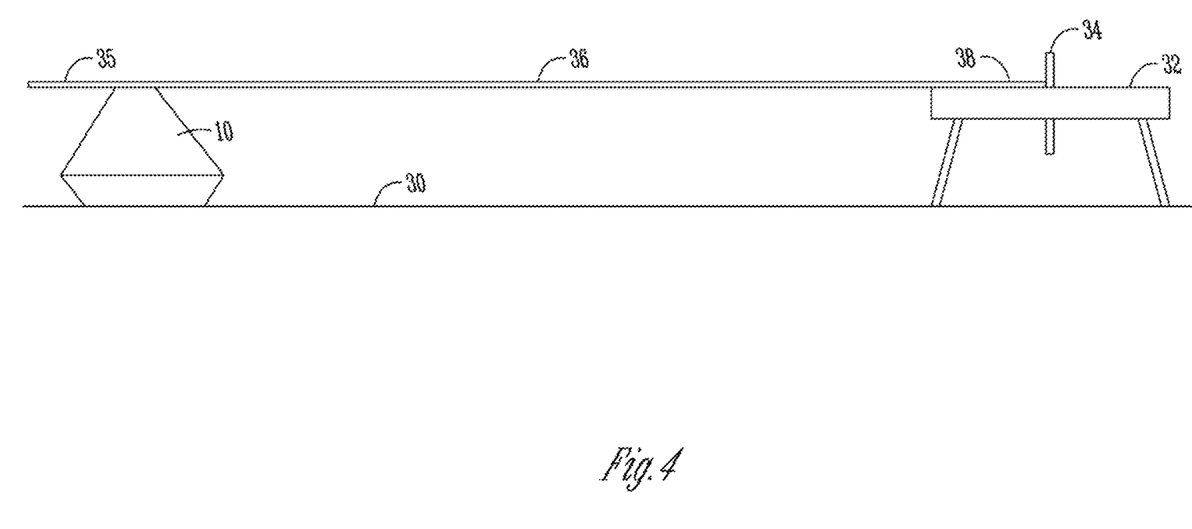
FIG. 4 is an elevation view showing the support block in use to support the outer end of a board being cut by a saw.

The block 10 has a triangular shape as shown in FIG. 3, with the points of the triangle being truncated. Thus, the block 10 has a first base 12, a second base 14, and a third base 16. Opposite each of the base surfaces 12, 14, and 16 are edges or board surfaces 18, 20, and 22. The first, second, and third bases are parallel to the first, second, and third edges, respectively. The first base 12 and the first edge 18 define a first height 24. The second base 14 and the second edge 20 define a second height 26. The third base 16 and the third edge 22 define a third height 28. Each of the heights, 24, 26, and 28 are different. For example, as shown in FIG. 3, in one embodiment, the first height 24 is 3½ inches, the second height 26 is 3¼ inches, and the third height 28 is 3 inches. The heights 24, 26, and 28 may vary from those in the drawings, without departing from the scope of the invention.

The block 10 can be rotated so as to position any one of the faces 12, 14, or 16 upon the ground or floor 30 at a distance spaced apart from the saw table or deck 32 having a saw blade 34, so as to support an outer or remote end 35 of a board or workpiece 36 to be cut. The orientation of block 10 is selected such that the height 24, 26, or 28 substantially matches the height of the saw table or deck 32 such that the board or work piece 36 is supported in a substantially horizontal position, with the board or work piece 36 being flat on the saw table or deck 32. Such support of the free end 35 of the board or work piece 36 will produce an accurate cut by the saw blade 34 at the inner workpiece end 38, since the opposite ends 35, 38 of the work piece 36 are substantially level or horizontal.

The block 10 also has opposite ends 40, 42 which are spaced apart so as to define a fourth height 44. The height 44 can be any desired height, such as 6⅜ inches shown in FIG. 1. The ends 40, 42 have a sufficient area to permit the block 10 to be set on one of the ends so as to support the board or work piece on the opposite end at the height 34.

Figure 1:
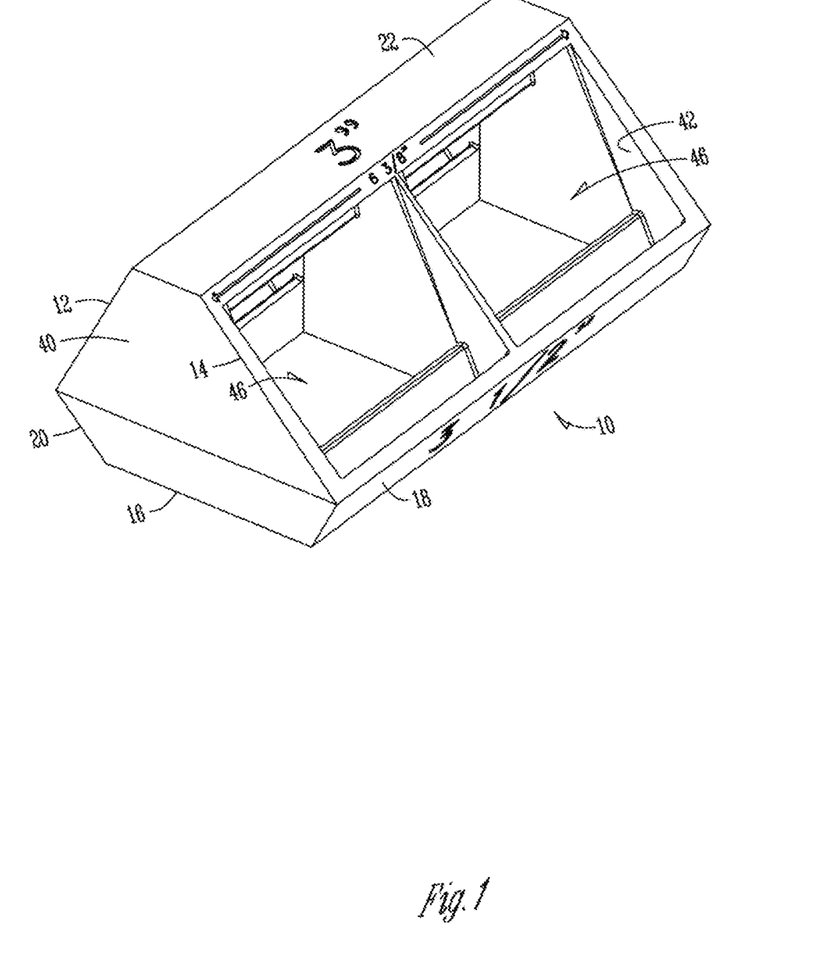
FIG. 1 is a perspective view of the carpenter's block of the present invention used to support one end of a work piece while the work piece is being cut by a saw.
Figure 2:
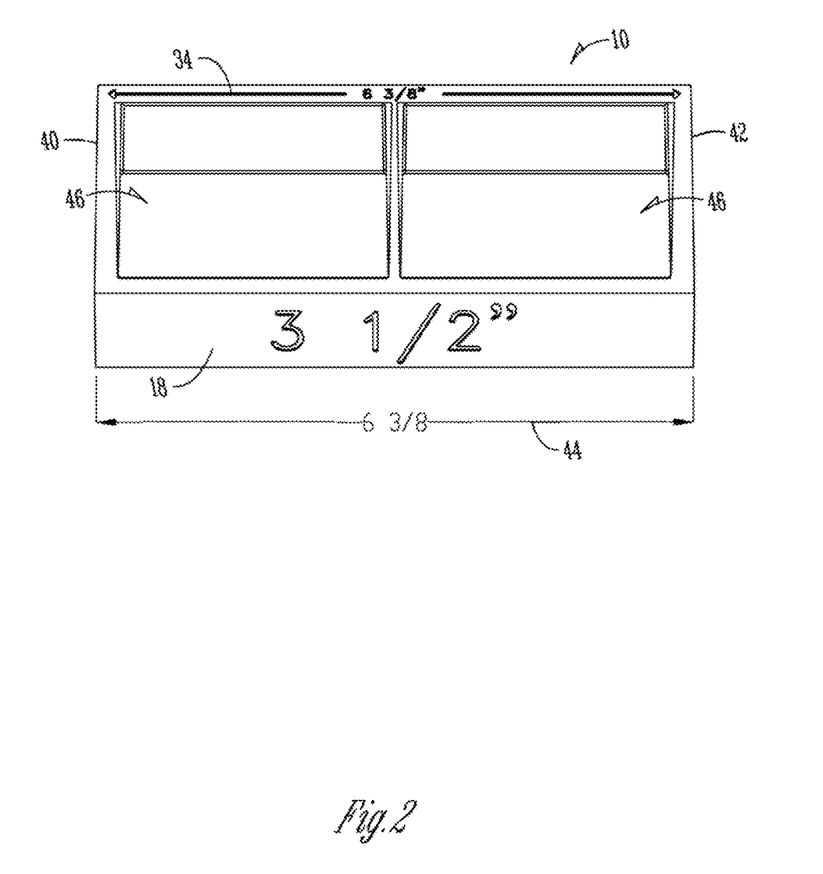
FIG. 2 is an elevation view from one face of the block.

Thus, the block 10 provides four height options for supporting the board or work piece 36 while the workpiece is being cut by the saw. Height indicia may be provided on each of the edges 18, 20, 22, as seen in FIGS. 1 and 2.

Preferably, the block 10 is hollow, with cutouts or recesses 46 which allow for easy pickup and gripping of the block 10. This construction also makes the block 10 lightweight.

The block 10 also accommodates fluctuations in the work piece, such as board warpage, to maintain the board or work piece 36 flat on the saw deck 32.

In use, the block 10 supports the outer end of 35 the work piece 36, opposite the saw blade 34, thus providing safer working conditions for the saw operator. For example, when cutting "stair railing pickets" for a spindle type stair hand railing, the saw user has to hold down the top part of the spindle to the saw deck. When cutting the angled top end of the picket, or shaving off a little of the end, in the conventional method without the block 10, one hand holds the end to be cut at a location very close to the blade 34, because there is nothing supporting the other end of the spindle. With the block 10 supporting the outer end of the picket, the operator can move their hand further from the blade 34 to a safer position, while the picket is supported on the deck 32 and on the block 10 for an accurate cut.

Figure 5:
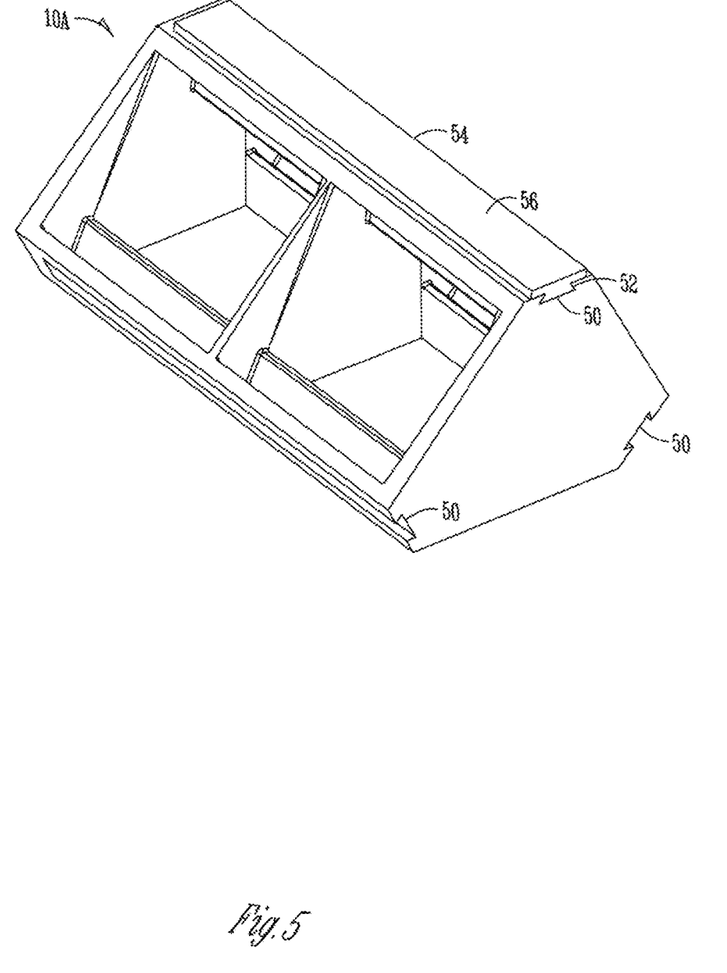
FIG. 5 is a perspective view of an alternative embodiment of the block having an extension member.
Figure 6:
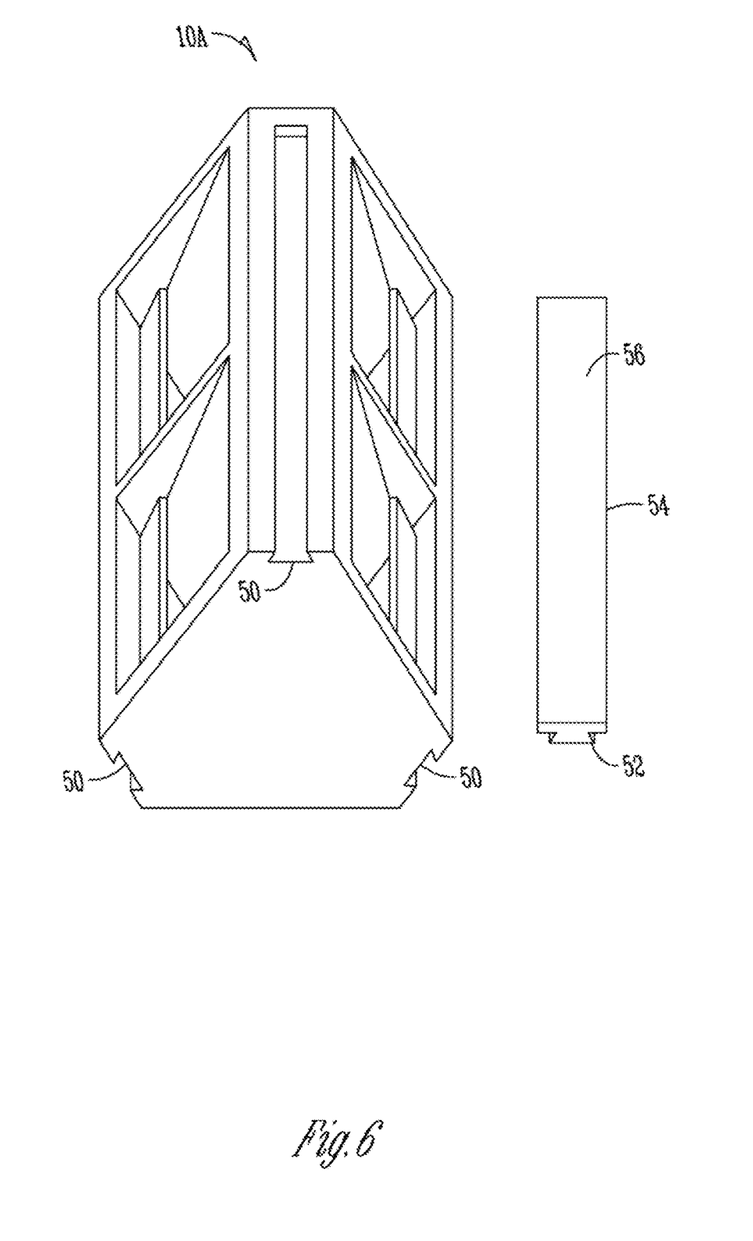
FIG. 6 is an exploded view of the alternative embodiment.

An alternative embodiment of the block 10A is shown is FIGS. 5 and 6. The block 10A includes a notch 50 on each of the edges 18, 20, 22. The notches 50 are adapted to matily receive a tongue or tab 52 on an extension member 54. Thus, the extension member 54 can be added on to any of the edges 18, 20, 22 of the block 10A to increase the support height of the block. For example, the extension member 54 can add at least a ¼ inch to the heights 24, 26, and 28. Multiple extension members 54 may be provided, each having a different height to allow the remote end of the work piece to be positioned level with the saw table or deck 32 and thereby assure an accurate cut of the work piece 36 by the saw blade 34.

Figure 7:
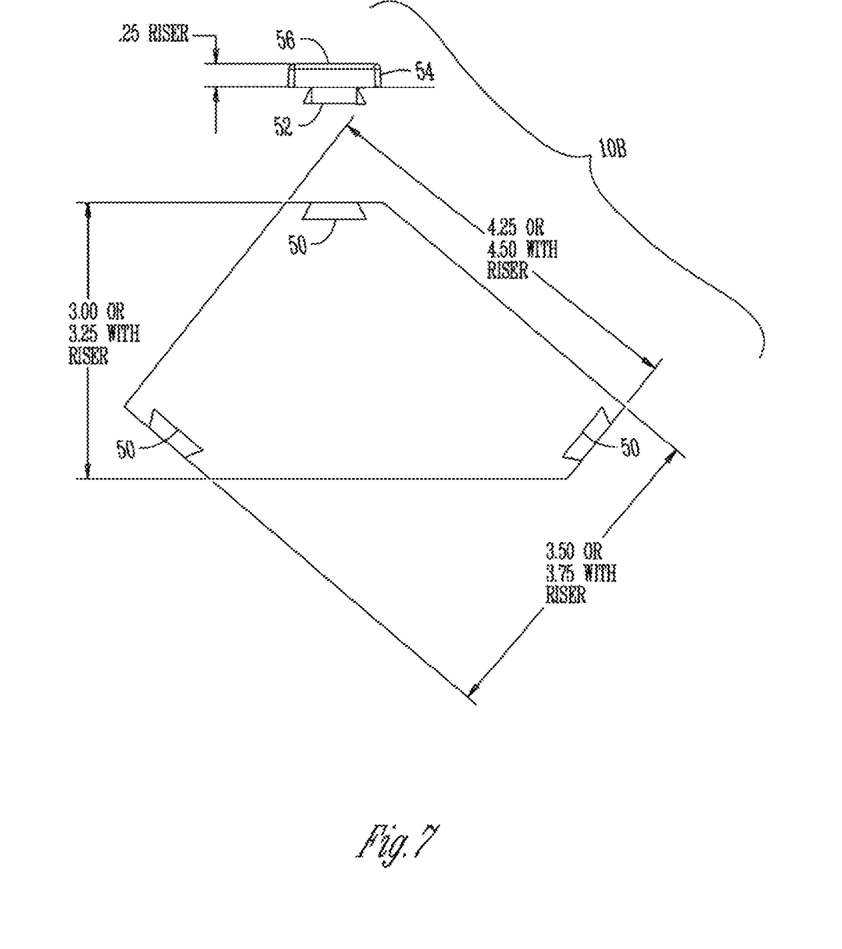
FIG. 7 is an exploded view of yet another embodiment of the block and extension of the present invention.

FIG. 7 shows another embodiment of the block 10B, which also has the notches 50 for the extension or riser 54. The dimensions in FIG. 7 are exemplary, and are not limitations for the block.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

From the foregoing, it can be seen that the present invention accomplishes all of the stated objectives.

What is claimed is:

1. A block for supporting one end of a board being cut with a saw, comprising:
    a unitary body substantially triangular in cross section so as to have three base surfaces and three board surface each being opposite and parallel to a respective one of the board surfaces, and the board surfaces being formed by truncated tips of the body to define heights from each base surface to the respective opposite parallel board surface;
    the heights varying for each base surface; and
    wherein the body is selectively set on one of the base surfaces to support the end of the board on the respective opposite board surface.

2. The block of claim 1 wherein the body has opposite ends defining an additional height to support the one end the board when the body is set on one of the ends.

3. The block of claim 1 further comprising an extension member mounted on the body to increase one of the heights.

4. The block of claim 3 wherein the block and the extension member have mating couplers.

5. The block of claim 3 wherein the block and the extension member have a male and female connection.

6. The block of claim 3 wherein the body has a notch on each board surface and the extension member has a tab for retentive engagement in the notch.

7. The block of claim 1 wherein the body has a recess for manual gripping.

8. A support block for a workpiece being cut by a saw blade, the workpiece being supported by a deck adjacent the saw blade and having a remote end spaced from the deck, the support block, comprising:
    first, second and third bases, each adapted to rest upon the floor or ground;
    first, second and third top edges opposite and parallel to the first, second and third bases, respectively, each edge being adapted to support the remote end of the workpiece during cutting; and
    the block having a different height from each base to the opposite parallel top edge;
    wherein the body is rotatable about a single axis to selectively position each of the three top edges in a substantially horizontal plane with the deck for supporting the workpiece remote end.

9. The support block of claim 8 wherein the first base and the first edge define a first height for the block, the second base and the second edge define a second height for the block, and the third base and the third edge define a third height for the block; and
    the first, second and third heights being different from one another.

10. The support block of claim 9 further comprising opposite ends which define a fourth height therebetween, and the fourth height being different than the first, second, and third heights.

11. The support block of claim 8 wherein the first, second and third bases form a triangular cross section for the support block with truncated points formed by the first, second and third top edges.

12. The support block of claim 8 further comprising an extension member mounted on the body to increase one of the heights.

13. The support block of claim 12 wherein the block and the extension member have mating couplers.

14. The support block of claim 12 wherein the block and the extension member have a male and female connection.

15. The support block of claim 12 wherein the body has a notch on each edge and the extension member has a tab for retentive engagement in the notch.

16. The support block of claim 8 wherein the body has a recess for manual gripping.

17. A method of cutting an elongated workpiece, comprising:
supporting the workpiece on a saw table in front of a sawblade whereby an end of the workpiece extends beyond the saw table;
supporting the end of the workpiece with a triangular-shaped block having three sides and opposite parallel ends, and being positioned between the saw table and the end of the workpiece;
rotating the block about a longitudinal axis to one side of the block or about a lateral axis to one end of the block to adjust the height of the end of the workpiece to a position substantially level with the saw table.

18. The block of claim 1 wherein the base surfaces and the board surfaces form three pairs of parallel edges for the body.

19. The block of claim 1 wherein the body is non-symmetrical.

20. The block of claim 1 wherein each base surface has a length greater than the height to the opposite board surface.

\* \* \* \* \*